(12) United States Patent
Fabry et al.

(10) Patent No.: US 8,557,210 B2
(45) Date of Patent: Oct. 15, 2013

(54) RECYCLING OF HIGH-BOILING COMPOUNDS WITHIN AN INTEGRATED CHLOROSILANE SYSTEM

(75) Inventors: Laszlo Fabry, Burghausen (DE); Uwe Paetzold, Burghausen (DE); Michael Stepp, Ueberackern (AT)

(73) Assignee: Wacker Chemie AG, Munich (DE)

( * ) Notice: Subject to any disclaimer, the term of this patent is extended or adjusted under 35 U.S.C. 154(b) by 877 days.

(21) Appl. No.: 12/281,550

(22) PCT Filed: Feb. 21, 2007

(86) PCT No.: PCT/EP2007/051664
§ 371 (c)(1),
(2), (4) Date: Sep. 3, 2008

(87) PCT Pub. No.: WO2007/101789
PCT Pub. Date: Sep. 13, 2007

(65) Prior Publication Data
US 2009/0016947 A1    Jan. 15, 2009

(30) Foreign Application Priority Data
Mar. 3, 2006   (DE) .......................... 10 2006 009 954

(51) Int. Cl.
*C01B 33/107*   (2006.01)
(52) U.S. Cl.
USPC .......................................... 423/342; 423/341
(58) Field of Classification Search
USPC .................................... 423/341, 342
See application file for complete search history.

(56) References Cited

U.S. PATENT DOCUMENTS

| | | | |
|---|---|---|---|
| 3,540,861 A | 11/1970 | Bradley et al. | |
| 3,863,577 A * | 2/1975 | Steever et al. | 110/245 |
| 4,058,069 A * | 11/1977 | Baing et al. | 110/244 |
| 4,079,071 A * | 3/1978 | Neale | 556/468 |
| 4,130,632 A | 12/1978 | Braunsperger et al. | |
| 4,252,780 A | 2/1981 | Koppl et al. | |
| 4,374,110 A | 2/1983 | Darnell et al. | |
| 4,676,967 A | 6/1987 | Breneman | |
| 4,690,810 A | 9/1987 | Breneman et al. | |
| 4,719,093 A | 1/1988 | Falk et al. | |
| 4,743,344 A | 5/1988 | Breneman et al. | |
| 5,080,804 A | 1/1992 | Ruff | |
| 5,252,307 A | 10/1993 | Ruff | |
| 5,785,941 A | 7/1998 | Maginot et al. | |
| 6,090,360 A * | 7/2000 | Herman | 423/348 |

(Continued)

FOREIGN PATENT DOCUMENTS

CN    1389466 A    1/2003
DE    3024319 A    1/1982

(Continued)

OTHER PUBLICATIONS

G. Roewer et al., Structure and Bonding, 101, pp. 69-71, Springer, 2002, Silicon Cabide—A Survey.

(Continued)

*Primary Examiner* — Ngoc-Yen Nguyen
(74) *Attorney, Agent, or Firm* — Brooks Kushman P.C.

(57) ABSTRACT

Trichlorosilane production is increased while simultaneously lowering environmental burden due to destruction and disposition of high boilers by feeding high boilers from trichlorosilane production or from polycrystalline silicon production into a fluidized bed for production of trichlorosilane from metallic silicon and hydrogen chloride.

15 Claims, 1 Drawing Sheet

(56) References Cited

U.S. PATENT DOCUMENTS

| | | | |
|---|---|---|---|
| 6,344,578 B1 | 2/2002 | Mautner et al. | |
| 6,541,650 B2 * | 4/2003 | Streckel et al. | 556/466 |
| 2002/0151737 A1 | 10/2002 | Kalchauer et al. | |
| 2002/0183537 A1 | 12/2002 | Streckel et al. | |
| 2002/0187096 A1 | 12/2002 | Kendig et al. | |
| 2003/0147798 A1 | 8/2003 | Kirii et al. | |
| 2005/0226803 A1 | 10/2005 | Pflugler et al. | |

FOREIGN PATENT DOCUMENTS

| | | | |
|---|---|---|---|
| DE | 3303903 A1 | 8/1983 | |
| DE | 3311650 A | 10/1983 | |
| DE | 3503262 A | 8/1986 | |
| DE | 3709577 A | 10/1987 | |
| DE | 3615509 A1 | 11/1987 | |
| DE | 4322804 A | 1/1995 | |
| DE | 10126558 C1 | 6/2002 | |
| EP | 0282037 A | 9/1988 | |
| EP | 0921098 A | 6/1999 | |
| EP | 1249453 A | 10/2002 | |
| EP | 1262483 A | 12/2002 | |
| EP | 1586537 A | 10/2005 | |
| EP | 1264798 A1 | 12/2009 | |
| GB | 1530986 A | 11/1978 | |
| JP | 53006297 A2 | 1/1978 | |
| JP | 58172221 A2 | 10/1983 | |
| JP | 59035017 A2 | 2/1984 | |
| JP | 01188414 A | 7/1989 | |
| JP | 09263405 A | 10/1997 | |
| JP | 2002371082 A2 | 12/2002 | |
| WO | WO0212122 A | 2/2002 | |
| WO | WO02100776 A | 12/2002 | |

OTHER PUBLICATIONS

E. Sirtl et al., J. Electrochem. Soc. 121, p. 919, 1974.
W.W. Du Mont et al., Organosilicon Chemistry V, Sep. 2001, Chem. Abstr., 142:155991.
T. Lobreyer and K. Hesse, Im Proceedings von Silicon for the Chemical Industry IV, in Geiranger, Norwegen, 3.-5.6., 1998, pp. 93-100, Ed: H.A.Oye, H.M. Rong, L. Nygaard, G. Schüssler, J. Kr. Tuset.
M. G. Kroupa, Proceedings Silicon for the Chemical Industriy V, pp. 201-207 Loen, Norwegen, Jun. 17-21, 2002.
G. Laroze et al., Proceedings Silicon for the Chemical Industry III, pp. 297-307, Trondheim, Norwegen, 1996.
V.S. Ban et al., J. Electrochem. Soc. 122, p. 1382, 1975.
L. P. Hunt, E. Sirtl, J. Electrochem. Soc. 119 (12), pp. 1741-1745, 1972.
A. Gupper et al., Eur. J. Inorg. Chem., 8, pp. 2007-2011, 2001.
F. Hoefler et al., Z. anorg. allg. Chem., 428, pp. 75-82, 1977.
E. Sirtl, K. Reuschel, Z. anorg. allg. Chem., 332, pp. 113-216, 1964.
V. F. Kochubei et al., Kinet. Katal., 19 (4), p. 1084, 1978.
Patent Abstract of Japan corresponding to JP 09263405 A.
Patent Abstract of Japan corresponding to JP 01188414 A.
Patent Abstract corresponding to DE 3024319 A.
Patent Abstract corresponding to DE 3503262 A.

* cited by examiner

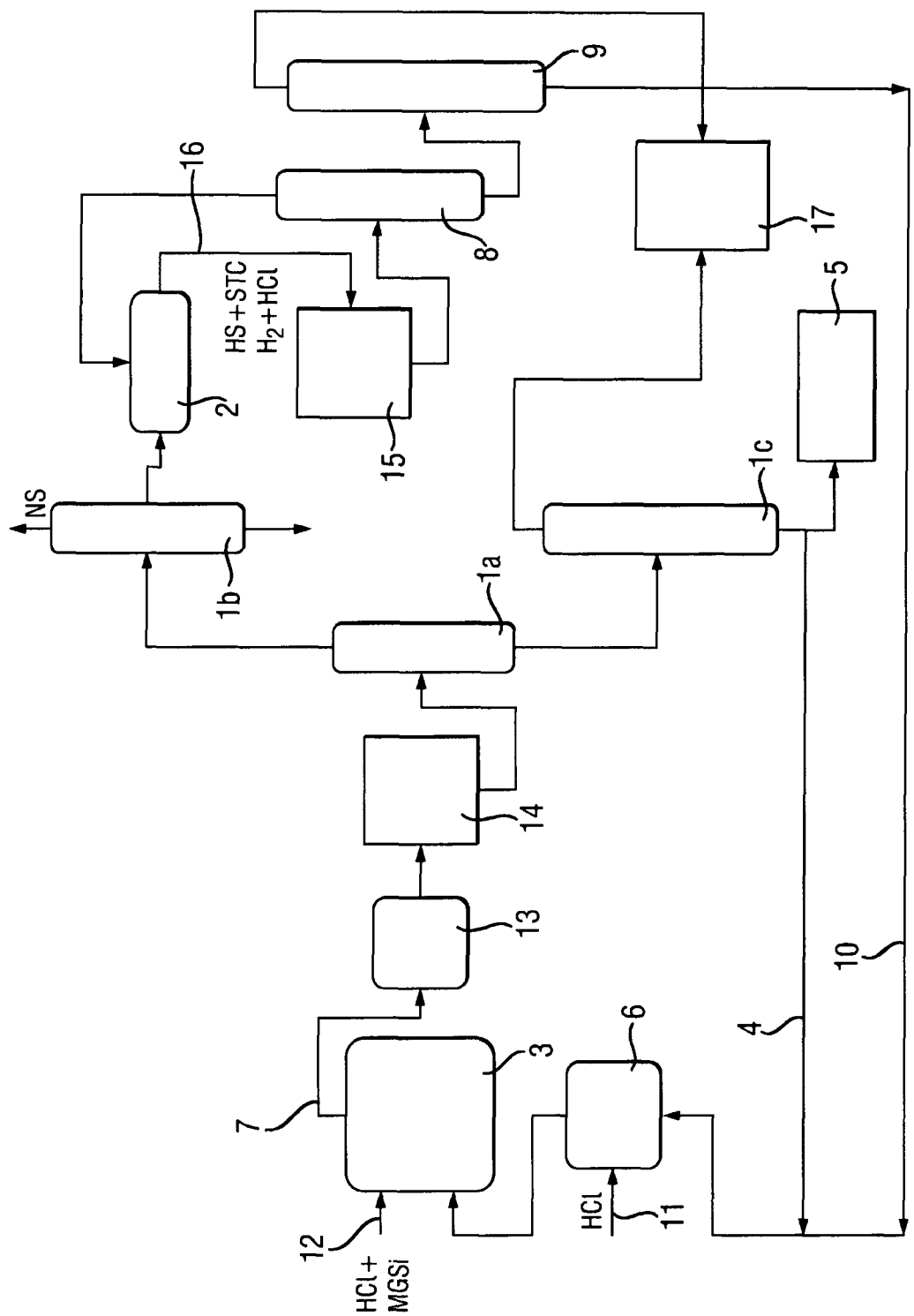

RECYCLING OF HIGH-BOILING COMPOUNDS WITHIN AN INTEGRATED CHLOROSILANE SYSTEM

CROSS-REFERENCE TO RELATED APPLICATION

This application is the U.S. national phase of PCT Appln. No. PCT/EP2007/051664 filed Feb. 21, 2007 which claims priority to German application DE 10 2006 009 954.0 filed Mar. 3, 2006.

BACKGROUND OF THE INVENTION

1. Field of the Invention

The invention relates to a method of reutilizing high-boiling compounds within an integrated chlorosilane plant.

2. Description of the Related Art

In the various subprocesses of the production of polycrystalline silicon, various chlorosilane compounds including high-boiling dichlorosilanes and oligochlorosilanes (HBs) are formed. The expression "high-boiling compound, high-boiling dichlorosilane and oligochlorosilane" or "high boiler" refers here to a compound which consists of silicon, chlorine, and possibly hydrogen, oxygen and carbon, and has a boiling point higher than that of tetrachlorosilane (57° C./at 1013 hPa). The compounds are preferably disilanes $H_nCl_{6-n}Si_2$ (n=0–4) and higher oligo(chloro)silanes which preferably have from 2 to 4 Si atoms and also disiloxanes $H_nCl_{6-n}Si_2O$ (n=0–4) and higher siloxanes which preferably have from 2 to 4 Si atoms, including cyclic oligosiloxanes and their methyl derivatives. In the following, low-boiling silanes having a boiling point of <40° C. under atmospheric conditions (1013 hPa) will be referred to as LBs for short.

Both the synthesis of trichlorosilane (TCS) from metallurgical silicon and HCl and the deposition of polycrystalline silicon (Poly) from trichlorosilane are based on thermal equilibrium processes of chlorosilanes, as are described, for example, in E. Sirtl, K. Reuschel, Z. ANORG. ALLG CHEM. 332, 113 216, 1964, or L. P. Hunt, E. Sirtl, J. ELECTROCHEM. SOC. 119(12), 1741-1745,1972. Accordingly, the trichlorosilane synthesis forms not only trichlorosilane and silicon tetrachloride (STC) but also dichlorosilanes and monochlorosilanes and also HBs according to a thermal equilibrium. The crude trichlorosilane from the trichlorosilane synthesis contains 0.05-5% of these HBs. In addition, about 20 ppm of various boron compounds, up to 200 ppm of TiCl4 and other metal chlorides such as FeCl2, FeCl3 and AlCl3 are formed in crude trichlorosilane production. These have to be separated from the products trichlorosilane and silicon tetrachloride.

Methods of separating trichlorosilane and silicon tetrachloride from the abovementioned HBs are known. Thus, U.S. Pat. No. 5,252,307, U.S. Pat. No. 5,080,804, U.S. Pat. No. 4,690,810 or U.S. Pat. No. 4,252,780 describe the concentration of the HB fractions contaminated with metal chlorides to 1% by weight to 50% by weight in the bottom offtake stream, followed by subsequent hydrolysis and disposal as hydrolysis residue. These processes result in silicon and chlorine losses and also in problems in disposing of the hydrolysate and the HCl-containing wastewater obtained [M. G. Kroupa in Proceedings. from SILICON FOR THE CHEMICAL INDUSTRY VI, pp. 201-207, Loen, Norway, Jun. 17-21, 2002].

Further undesirable high-boiling chlorodisiloxane fractions arise in the distillation and partial hydrolytic purification of chlorosilanes. These high-boiling fractions have hitherto likewise been disposed of as hydrolysis residues and HCl-containing wastewater, as described, for example, in U.S. Pat. No. 6,344,578 B1, U.S. Pat. No. 3,540,861 or U.S. Pat. No. 4,374,110.

Furthermore, it has been both theoretically deduced [E. Sirtl, K. Reuschel, Z. ANORG. ALLG CHEM. 332, 113 216, 1964; E. Sirtl et al., J. ELECTROCHEM. SOC. 121, 919-, 1974; V. F. Kochubei et al., KINET. KATAL., 19(4), 1084, 1978] and demonstrated analytically [V. S. Ban et al., J. ELECTROCHEM. SOC. 122, 1382-, 1975] that HBs (hexachlorodisilane, pentachlorodisilane, tetrachlorodisilane and trichlorodisilane) are also formed in the deposition of polycrystalline silicon from trichlorosilane. These HBs, which are highly pure in respect of dopants and metals, are present in the bottom offtake stream from the polycondensate distillation, which can be converted by means of silicon tetrachloride at 600-1200° C. [WO02/100776 A1].

HBs can also be cracked in the presence of hydrogen in a low-temperature conversion in a fluidized-bed reactor [JPHei1-188414-Osaka Titanium 1988].

Polychlorosilanes ($Si_nCl_{2n+2}$; 4≥n≥2), in particular $Si_2Cl_6$ (HCDS) decompose at z 700° C. in the presence of silicon crystal nuclei or on a heated silicon core [EP282037-Mitsubishi 1988]. It is also known that highly pure HCDS can be isolated from the offgases from the deposition of polycrystalline silicon [WO2002012122-Mitsubishi, 2002]. The cleavage of polychlorodisilanes by means of HCl over activated carbon can proceed even in the range from 30 to 150° C. [JP09-263405-Tokuyama 1996]. The reaction of this HB fraction together with silicon tetrachloride and hydrogen can be carried out in a high-temperature reactor (Dow Corning 2001 [US2002/0187096]). Disilanes from the direct synthesis of organosilanes can likewise be converted into trichlorosilane and/or silicon tetrachloride at 300° C. [U.S. Pat. No. 6,344,578 B1 Wacker 2000]. Low-temperature cleavage occurs in the presence of nucleophilic catalysts [F. Hoefler et al., Z. ANORG. ALLG. CHEM. 428, 75-82, 1977; DE3503262-Wacker 1985; G. Laroze et al, Proceedings, from SILICON FOR THE CHEMICAL INDUSTRY III, pp. 297-307, Trondheim, Norway, 1996; W.-W. du Mont et al, ORGANOSILICON CHEMISTRY V, Sep. 2001, Chem. Abst., 142:1555991; G. Roewer et al., SILICON CARBIDE—A SURVEY IN STRUCTURE AND BONDING 101, pp. 69-71, Springer 2002]. Lewis acids such as $AlCl_3$ can likewise catalyze the cleavage of Si—Si bonds [A. Gupper et al., EUR. J. INORG. CHEM, 8, 2007-2011, 2001].

All these methods of removing undesirable HBs from processes for producing polycrystalline silicon involve a high engineering outlay for the disposal, separation and purification steps. In addition, losses of chlorine and silicon cannot be avoided.

The thermal decomposition of HBs in the presence of silicon tetrachloride and hydrogen is known from JPHei1-188414 of Osaka Titanium.

SUMMARY OF THE INVENTION

The present invention provides a process for preparing trichlorosilane by reaction of metallurgical silicon and HCl at a temperature of from 290° C. to 400° C. in a fluidized-bed reactor, which is characterized in that a high-boiling compound is fed into the fluidized-bed reactor.

BRIEF DESCRIPTION OF THE DRAWINGS

FIG. 1 illustrates one embodiment of the process of the invention in schematic form.

DETAILED DESCRIPTION OF THE PREFERRED EMBODIMENTS

The HBs preferably originate from the offgases formed in the production of polycrystalline silicon or in the preparation of trichlorosilane. The process of the invention thus makes it possible to increase the trichlorosilane yield in the preparation in a fluidized-bed reactor and allows inexpensive reutilization of HBs. It minimizes the silicon losses and decreases pollution of the environment by reducing the need for deposition in landfill and reducing the amount of acidic hydrolysate products.

FIG. 1 shows, by way of example, an integrated chlorosilane plant comprising an embodiment of the recirculation (4/10) according to the invention of the HBs from the offgases formed in the preparation of trichlorosilane in a fluidized-bed reactor (3) or in the production of polycrystalline silicon (deposition 2).

The offgases (7) from the fluidized-bed reactor (3) are introduced via a dust removal system, generally a dust filter (13), and a condensation system (14) into a separation column (1a and 1b) where trichlorosilane and LBs are separated from silicon tetrachloride and HBs. Silicon tetrachloride and HBs are introduced into a high boiler column (1c) where silicon tetrachloride is partly separated from the HBs. In an embodiment of the process of the invention, the HB-containing mixture having an atmospheric boiling point of 80-155° C. is recirculated (4) into a fluidized-bed reactor (3) for producing trichlorosilane within the integrated chlorosilane plant.

In another embodiment of the process of the invention, the offgas originating from the deposition (2) for the production of polycrystalline silicon is recirculated to a fluidized-bed reactor (3) for producing trichlorosilane within the integrated chlorosilane plant. The offgas from the deposition is preferably conveyed via a condensation system (15) to a polycondensate column (8) in which silicon tetrachloride and HBs are separated from trichlorosilane and LBs. Silicon tetrachloride and HBs are in turn introduced into an HB enrichment column (9) in which silicon tetrachloride is partly separated off from HBs. The HBs mixture formed here is, according to the invention, recirculated (10) to the fluidized-bed reactor (3) for producing trichlorosilane. It is likewise possible to recirculate an offgas mixture from both embodiments of the process of the invention to the fluidized-bed reactor for producing trichlorosilane. It has surprisingly been found that the HB-containing mixtures react with metallic silicon to form trichlorosilane in a fluidized-bed reactor (3).

In the first process variant mentioned, the HB fraction (4) is preferably recirculated from the lower side offtake of the HB distillation (1c) to a fluidized-bed trichlorosilane reactor (3). Preference is given to feeding part (1-50%) of the HB fraction from the lower side offtake of the HB distillation (1c) to the HB destruction (5) in order to avoid an increase in the concentration of silicon tetrachloride and $TiCl_4$ and $AlCl_3$ and other metal chlorides and also siloxane in the fluidized-bed reactor 3. Preference is given here to recirculating 50-99% by weight of the HB fraction having an atmospheric boiling point of 80-155° C. from the lower side offtake of the high boiler distillation (1c) to a fluidized-bed trichlorosilane reactor (3). The recirculated HB mixture also contains silicon tetrachloride (<50%) and abovementioned metal chlorides in a concentration of <5000 ppm. This variant of the process of the invention reduces the disposal to HB destruction by 50-99% by weight so as to protect the environment and increases crude trichlorosilane production by up to 1% by weight.

The offgas (16) of a deposition reactor (2) for the production of polycrystalline silicon from trichlorosilane also comprises HBs together with monochlorosilane, monosilane, dichlorosilane, trichlorosilane and silicon tetrachloride. After trichlorosilane and silicon tetrachloride have been partly separated off by distillation in the polycondensate column (8), the HBs are concentrated to 0.5-20% by weight in the residue. These HBs are obtained as bottom product from the polycondensate column (8) in a fraction at atmospheric pressure and a temperature of 80-155° C. If appropriate, the HB mixture can be concentrated to 50% of HBs in an enrichment column (9).

It has been found that this HB-containing fraction (10) can be cleaved without problems to give trichlorosilane and silicon tetrachloride in the fluidized-bed trichlorosilane reactor (3). Since this HB fraction comprises both HBs and silicon tetrachloride but is obtained in a very high purity in respect of dopants, carbon compounds and metal compounds, this fraction can be recirculated directly to the fluidized-bed reactor (3). After recirculation (10) into the fluidized-bed reactor (3), no accumulation of HBs in the offgas (7) from the fluidized-bed oven (3) was found. This variant of the process of the invention makes it possible to achieve 100% reutilization of the HBs from the offgas (16) from the deposition of polycrystalline silicon, so that environmentally polluting disposal is no longer necessary. In addition, the yield in the production of crude trichlorosilane is increased by at least 2% by weight.

In the process, silicon tetrachloride is obtained as a highly pure overhead product from the HB enrichment column (9) and the HB column (1c). This silicon tetrachloride can either be converted into trichlorosilane by means of hydrogen (DE 3024319) in a converter (17) or pyrolyzed in a flame to form finely divided silica (HDK®, 17) (DE4322804), as described by T. Lovreyer and K. Hesse (T. Lobreyer et al. im Proceedings, from, *SILICON FOR THE CHEMICAL INDUSTRY IV*, in Geiranger, Norway, Jun. 3-5, 1998, pp. 93-100 Ed.: H. A. Oye, H. M. Rong, L. Nygaard, G. Schussler, J. Kr. Tuset).

The recirculation of the HB mixture (4/10) or the separated high boiler fractions (4 and 10) to the fluidized-bed reactor (3) is preferably effected via a saturator (6).

In the saturator (6), the HB mixture is mixed into part of the HCl (preferably from 10 to 40% by weight) (11) and mixed with the main stream of HCl and added metallic silicon (12, MGSi) which is fed to the fluidized-bed reactor for producing trichlorosilane. This mixture is fed to the fluidized-bed reactor (3).

Analysis of the composition of the HB mixture (4) and the offgas composition (7) after a number of days of operation has indicated that the concentration of polychlorodisiloxanes $H_nCl_{6-n}Si_2O$ (n=0-4) has increased by about one order of magnitude, which does not adversely affect the process. An increase in the concentration of metal chlorides which would interfere in the process was not measurable in the process of the invention.

The following examples serve to illustrate the invention:

Example 1

Preparation of Trichlorosilane

Comparative Example

In a reactor system comprising a fluidized-bed reactor (3), a dust removal system (13) and a condensation system (14) (described in U.S. Pat. No. 4,130,632), metallurgical silicon having a purity of >98% of silicon was reacted with hydrogen chloride gas.

This gave, after condensation, a crude silane mixture comprising 70-90% by weight of trichlorosilane, 10-29.2% by weight of silicon tetrachloride, 0.1-0.5% of LBs (dichlorosilane and monochlorosilane) and 0.1-0.3% of HBs. Furthermore, the crude silane contained metal chlorides (e.g. $TiCl_4$ and $AlCl_3$) in the ppm range.

About 2 t/h of crude silane were produced from 425 kg/h of silicon and 1750 kg/h of HCl. The composition of the crude silane was 0.35% of low boilers (monochlorosilane and dichlorosilane), 79.3% of trichlorosilane, 20.1% of silicon tetrachloride and 0.25% of HBs. The HB fraction was composed of about 50% of disilanes, 47% of disiloxanes and about 3% of higher polychlorooligosilanes and siloxanes. About 5 kg/h of HB fraction were formed. This amount corresponds to about 2.5 kg of HB fraction per 1000 kg of crude silane produced, which therefore had to be disposed of by hydrolysis.

Example 2

Return (4) of the HBs from the offgas (7) from the preparation of trichlorosilane as described in example 1 to the preparation of trichlorosilane in the fluidized-bed reactor (3).

A process for preparing crude silanes was carried out as described in example 1. The offgases from the process were fed to the separation column (1a) and then introduced into a high boiler column (1c). The HBs were enriched in this way. About 20% by weight (1 kg/h) of the HB fraction were separated off and passed to HB destruction (5). The remaining 4 kg/h of the HB fraction were transferred to a heatable saturator (6) and from there fed with the aid of an HCl carrier gas stream (11) to the fluidized-bed reactor (3). The total amount of HCl (11+12) was divided for this purpose (90% was fed directly (12) into the fluidized bed (3) and 10% of the amount of HCl was used as carrier gas (11) for conveying HBs). At the prescribed reaction temperature, the cleavable components of the HB fraction were converted into monomers, while uncleavable components accumulate to some extent in the crude silane.

In this example, only 1.2 kg of HB fraction per 1000 kg of crude silane had to be disposed of by hydrolysis.

Example 3

Return (10) of the HBs from the offgas (16) from the production of polycrystalline silicon (2) to the preparation of trichlorosilane in the fluidized-bed reactor (3).

The process for preparing crude silane was carried out as described in example 1. In addition, 10 kg/h of the HB fraction from the polydeposition (2) together with ⅒ of the total amount of HCl (11) were fed via the saturator (6) into the fluidized-bed reactor (3).

It was surprisingly found that the composition of the crude silane obtained in this way did not differ from that from example 1 (0.25% of HBs). This means that the polychlorodisilanes in the HB fraction were converted completely into monomers such as trichlorosilane or silicon tetrachloride.

No additional HBs which had to be disposed of were formed. The HBs obtained in the polydeposition (2) could, after condensation (15) and separation by distillation (8) or enrichment (9), be converted completely into trichlorosilane or silicon tetrachloride by recirculation (10) to the fluidized-bed reactor (3) in the process of the invention.

Example 4

Return of the HBs from an Offgas Mixture 4 and 10

It has in practice been found to be useful to process the HB fractions together. The synthesis was carried out as described in example 1. In addition, 4 kg/h of HB fraction from the high boiler column (1c) and 10 kg/h of HBs from the offgas (16) from the polydeposition (2) were introduced into the saturator (6) and then fed together with about 175 kg/h of HCl carrier gas (11) into the fluidized-bed reactor (3). As in example 2, the concentration of oligosiloxanes in the crude silane increased somewhat.

1.2 kg of HBs per 1000 kg of crude silane had to be disposed of by means of hydrolysis in the HB destruction (5).

The invention claimed is:

1. An integrated plant process for the production of trichlorosilane, comprising the following steps:
    A) feeding hydrogen chloride to a fluidized bed reactor (1) charged with metallurgical grade silicon and reacting the hydrogen chloride with the metallurgical grade silicon in the fluidized bed reactor (1) at a temperature of 290° C. to 400° C. to form a gaseous chlorosilane product stream containing trichlorosilane;
    B) introducing a high boiler fraction containing high boilers, derived from a) the chlorosilane product stream of a plant process for production of trichlorosilane, b) the offgas of polycrystalline silicon production, or c) high boilers from both a) and b), into a saturator together with at least a portion of the hydrogen chloride fed to the fluidized bed reactor (1) in step A) to form a high boiler- and hydrogen chloride-containing mixture, and
    C) feeding the high boiler- and hydrogen chloride-containing mixture from the saturator in step B) to the fluidized bed reactor (1) and recovering a chlorosilane product stream with a greater amount of trichlorosilane than is recovered in the absence of feeding high boilers to the fluidized bed reactor (1), wherein when the high boiler- and hydrogen chloride-containing mixture contains high boilers from a gaseous chlorosilane product stream from a fluidized bed reactor for preparing trichlorosilane, the gaseous chlorosilane product stream is filtered to remove silicon dust such that the high boiler- and hydrogen chloride-containing mixture is free of silicon dust, and wherein the high boilers have a boiling point at standard pressure greater than the boiling point of silicon tetrachloride, and are composed of silicon, chlorine and optionally hydrogen, oxygen, and carbon.

2. The process of claim 1, wherein the high-boiling fraction comprises at least one of a disilane of the formula $H_nCl_{6-n}Si_2$ where n is 0–4, a higher oligo(chloro)silane, a disiloxane $H_1Cl_{6-n}Si_2O$ where n is 0–4, or a higher siloxane.

3. The process of claim 2, wherein a higher oligo(chloro)silane has from 2 to 4 Si atoms.

4. The process of claim 2, wherein a higher siloxane has from 2 to 4 Si atoms.

5. The process of claim 2, wherein a higher siloxane is a cyclic oligosiloxane.

6. The process of claim 2, wherein the high boiling fraction contains silicon compounds bearing methyl groups.

7. The process of claim 1, wherein the high-boiling fraction originates in its entirety from the offgases formed in the production of polycrystalline silicon.

8. The process of claim 1, wherein the high-boiling fraction originates from the offgases formed in the preparation of trichlorosilane in a fluidized-bed reactor.

9. The process of claim 8, wherein 50-99% by weight of a high-boiling fraction from a high boiler distillation of a chlorosilane product stream from a fluidized bed reactor for preparing trichlorosilane are recirculated to the fluidized-bed reactor and 1-50% by weight of the high-boiling fraction are passed to high boiler destruction.

10. The process of claim 1, wherein the high boiler fraction fed to the fluidized bed reactor is derived from both a) and b).

11. The process of claim 1, wherein the high boiler fraction has a boiling point of 80° C. to 155° C. at atmospheric pressure.

12. The process of claim 1, wherein the high boiler fraction contains silicon tetrachloride, in an amount of less than 50% by weight.

13. The process of claim 7, wherein the high boiler fraction is concentrated by distillation to contain a high boiler content of from 0.5-20% by weight relative to the weight of the high boiler fraction.

14. The process of claim 7, wherein the high boiler fraction contains 20% to 50% of high boilers based on the weight of the high boiler fraction.

15. The process of claim 1, wherein the process for production of trichlorosilane produces a chlorosilane product stream containing from 70% to 90% by weight of trichlorosilane without introduction of the high boiler fraction into the reactor.

* * * * *